July 26, 1966 M. D. STRICKLER 3,262,723
FINGER JOINTING OF LUMBER
Filed May 29, 1961 4 Sheets-Sheet 1

INVENTOR.
MELVIN D. STRICKLER
BY
ATTYS.

INVENTOR.
MELVIN D. STRICKLER
ATTYS.

July 26, 1966     M. D. STRICKLER     3,262,723
FINGER JOINTING OF LUMBER
Filed May 29, 1961     4 Sheets-Sheet 3
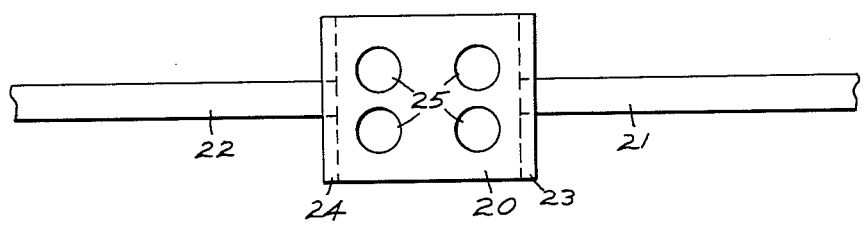
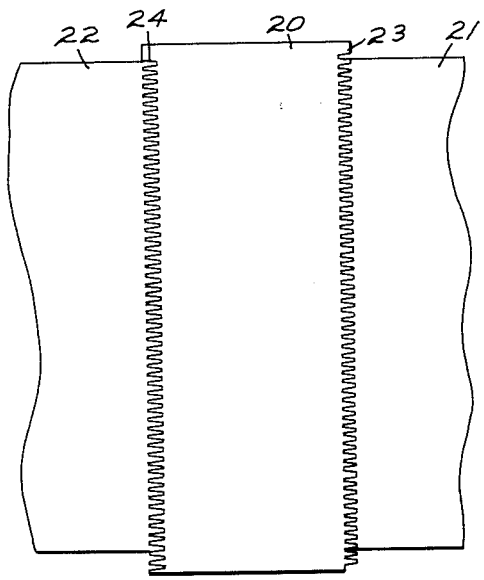
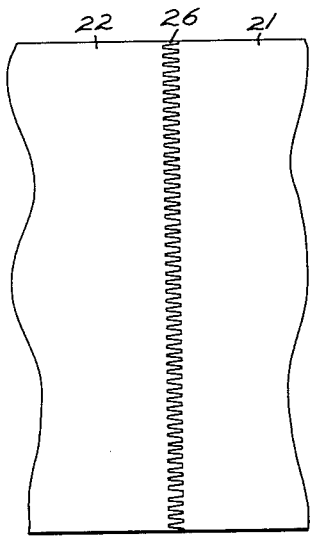
INVENTOR.
MELVIN D. STRICKLER
BY
ATTYS.

July 26, 1966     M. D. STRICKLER     3,262,723
FINGER JOINTING OF LUMBER
Filed May 29, 1961     4 Sheets-Sheet 4
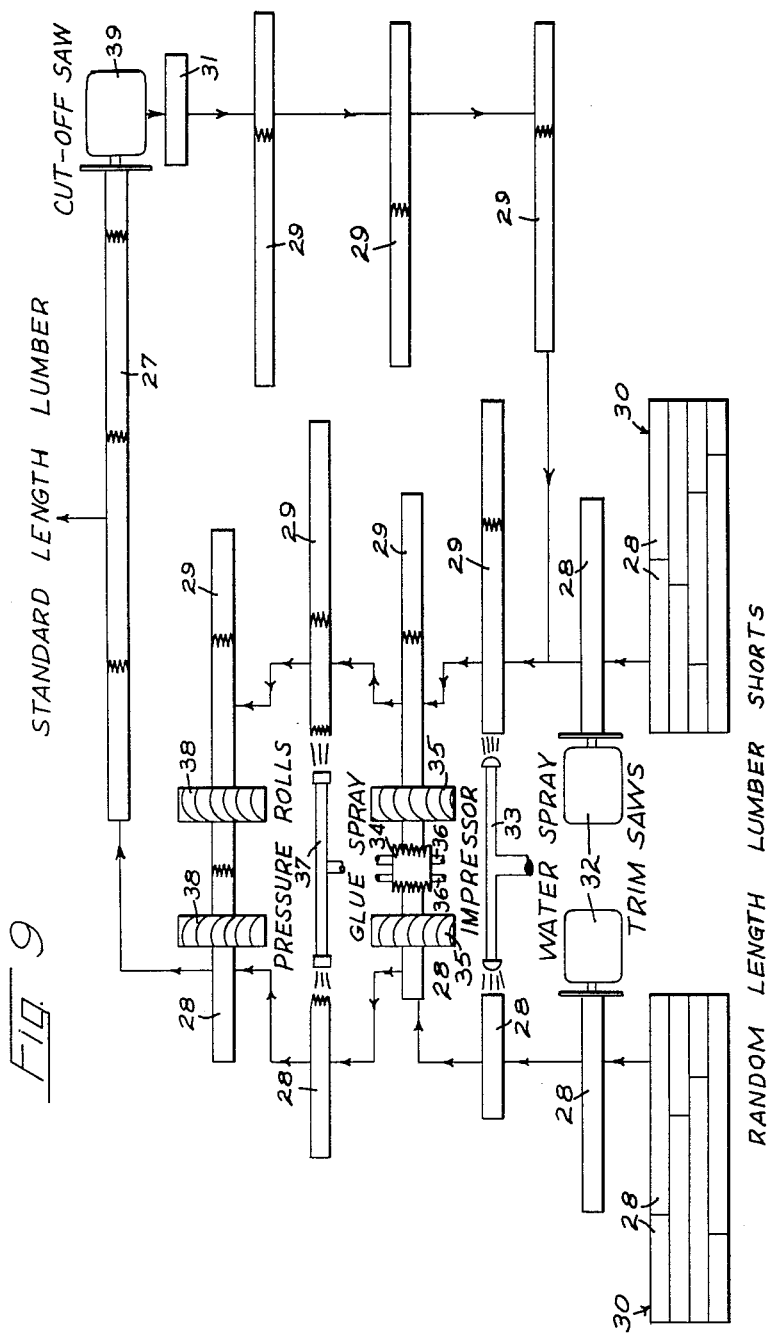
INVENTOR.
MELVIN D. STRICKLER
BY
ATTYS.

United States Patent Office 3,262,723
Patented July 26, 1966

3,262,723
FINGER JOINTING OF LUMBER
Melvin D. Strickler, Pullman, Wash., assignor to Washington State University Research Foundation, Pullman, Wash.
Filed May 29, 1961, Ser. No. 113,528
14 Claims. (Cl. 287—20.92)

This invention relates to a novel finger joint for end joining lumber and to the process of obtaining the novel joint.

The joint described herein is designed for use in the lumber industry to facilitate the salvage of short pieces of lumber developed necessarily in their manufacturing processes, or to produce long lengths for subsequent edge-gluing into panels or laminating into structural items. Present methods of end gluing are relatively inefficient compared to parallel grain gluing of wood between parallel layers such as the methods used in the plywood industry. At present, the most efficient end joint is a scarf joint. However, such joints require relatively long pieces of lumber for efficient use and are quite wasteful of adjoining lumber at the joint area. In order to solve this problem the present invention contemplates the use of a novel finger joint having fingers cut transversely across the lumber to a depth no more than three-eighths of one inch. The fingers are not merely cut into the lumber but are impressed, using a combination of pressure, moisture and heat to set the fingers without breaking or smashing the adjacent wood fibers. The description below specifically enumerates several representative joints and the typical process for obtaining such joints.

The first object of this invention is to provide an improved method of end joining or end gluing lumber. This primary object is to provide a method of end gluing lumber more easily and cheaply than present methods and to produce a higher degree of efficiency than is possible in the current practice.

A second object of this invention is to provide a method of end joining lumber, using fingers which are very short, in order to eliminate needless waste of wood about the joint areas.

Another object of this invention is to eliminate the use of cutterheads in a finger jointing process for end gluing lumber. This results in a lessening of equipment costs and maintenance.

Another object of this invention is to reduce the glue costs for finger jointing by the use of short fingers. This factor is again of important economic value in the lumber industry.

Another object of this invention is to provide a method of finger jointing which is readily adaptable to the present pre-heat technique of bonding lumber. This technique involves heating the wood surfaces first, applying a thermosetting glue to the hot wood and then quickly mating the wood surfaces, utilizing the heated wood surfaces to set the glue bond. Since the present invention contemplates the heating of the wood fingers during impression, it can be seen that this method of joining can be readily adapted to the pre-heat technique of bonding.

It is another object of this invention to provide joint surfaces which are manufactured to very close tolerances which can be extremely well controlled. Thus the quality of the wood joints is reproducible.

These and other objects will be evident from a study of the following disclosure taken in conjunction with the accompanying drawings which illustrate several forms of the novel joint and a method of producing the joint. The described invention is merely exemplary of the many forms possible using the basic concepts described therein. For this reason the description is to be considered merely illustrative and is not to limit or restrict the extent of the invention except as it is defined in the claims which follow.

In the drawings:

FIGURE 6 is an end view of a die, having two relatively thin boards impaled thereon;

FIGURE 7 is a top view of the die and boards seen in FIGURE 6;

FIGURE 8 is a top view of the boards shown in FIGURE 7 as they appear when finally jointed; and FIGURE 9 is a schematic flow diagram of a typical process of producing end jointed lumber according to the present invention.

Figure 1:
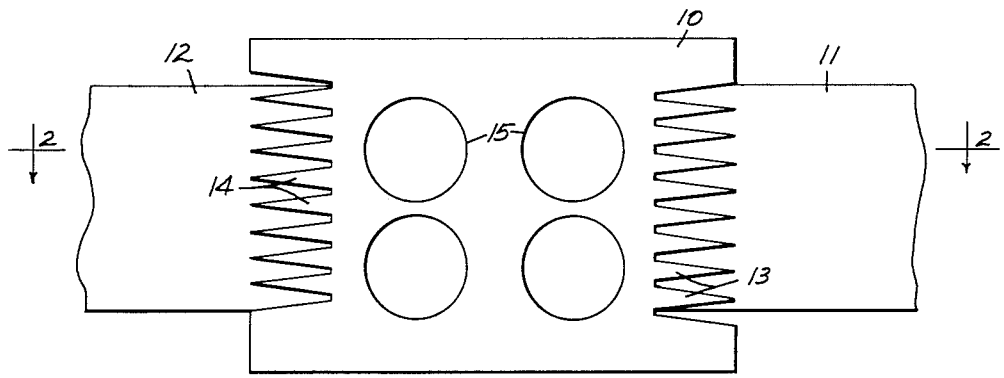
FIGURE 1 is an end view of a die having two boards impaled thereon, the ends of the board being broken away.

The present economic situation with respect to the lumber industry is such that it is practical and even necessary to salvage short pieces developed in manufacture. One salvage method is to glue short pieces of lumber end to end in order to produce longer lengths. Likewise, it is often advantageous to upgrade low-grade lumber by cross-cutting out defects and rejoining the short pieces thus produced to yield clear lumber of any desired length. Also, demand is continuously increasing for laminated arches and beams in longer lengths than can be produced in solid form. Therefore it is necessary to end glue standard length lumber in order to produce individual laminae in the desired lengths.

It is well known that parallel grain gluing of wood is the most efficient method of gluing and that this method easily develops the full strength of the wood under a variety of conditions. Parallel grain gluing is defined as the bonding of wood planes essentially parallel to the fibers such as in joining two boards face to face or edge to edge. It is estimated that over 90 percent of all wood gluing is of this type. In contrast to this type of gluing, end gluing has been the least practiced of all for both economical and technical reasons. Technically, the severed ends of fibers in a crosscut surface have, by all previous means, been impossible to rejoin in a manner to develop their original strength. It has, in fact, been impossible to develop more than a small percentage of the original strength in square cut butt joints.

Strengthwise, the most efficient end joint in current use is the scarf joint. Scarf joints minimize the adverse effect of end grain surfaces by substituting long sloping surfaces in place of the square crosscut end. This creates a compromise of end and face characteristics which, when carried to extreme slope, may develop over 90 percent of the original strength of the wood. The principal disadvantage of this method is the high wood loss associated with cutting the scarf. On short material this method could result in a loss of from 30 to 50 percent of the stock. Efforts to save stock by shortening the scarf always result in loss of joint strength. In addition, there is the problem of cutterhead maintenance, the variable quality of surfaces such equipment produces, and the consequent variable quality of joint.

An alternate method of end gluing wood involves finger jointing in a multitude of configurations. The outstanding advantages of finger jointing systems compared to scarf jointing is their greatly reduced wood loss. These systems develop a series of short scarfs across the cut end resembling fingers or a combination of fingers and scarfs (serrated scarfs) which are spread with glue and mated under pressure. The principal difficulty in this method is low joint strength. Also, the cutterhead maintenance problem is aggravated and variable quality output results. Cutterheads dull during prolonged use, and surface quality diminishes accordingly.

Thus it is seen that present methods of end joining wood involve either high wood loss or low strength, and all suffer the cost, inconvenience, and unreliability of cutterheads. My invention eliminates all of these disadvantages including the cutterheads and their expensive maintenance. At the same time my invention yields joints equivalent in strength to scarf joints while wasting less wood than is true with the shortest finger joints.

The solution of the problem involves creating a series of small matching fingers on the ends of both wooden pieces to be joined, by means of a die under pressure. The action of the die is such as to produce desirable parallel grain surfaces on each finger, thereby developing superior bonding surfaces.

The use of cutterheads is eliminated and machine maintenance is therefore greatly reduced. Also, since optimum surface conditions for bonding are obtained, the fingers may be very short, thus reducing the amount of wood loss. Finally, the quality of the surfaces and the greatly reduced area involved in each joint permits a minimum of glue usage.

The present invention contemplates the use of a metal die having a plurality of fingers formed thereon, on which the ends of the boards to be jointed are impaled. The fingers of the die are wedge-shape and relatively short and are designed to bend and compress the wood fibers rather than to cut them. This die shall be termed the "impressor." This impressor is designed to be heated in order permanently to set the fingers in the boards in their compressed state. The invention must also utilize a pressure system capable of exerting sufficient end pressure on the wooden members to be joined so as to impale them endwise on the fingers of the impressor. The finger tips of the impressor can then cleave the wood along the grain. The wood between the impressor fingers is compressed by this wedging action until the impression is complete. The impression of the wood is then set by the use of suitable heat. As a final step the invention contemplates the application of glue along the fingers of the wooden members and a second application of end pressure against the boards during their bonding.

Figure 2:
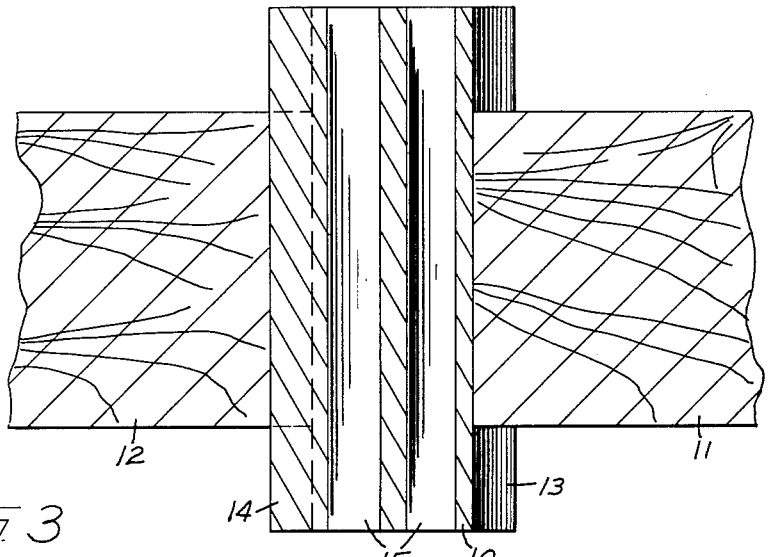
FIGURE 2 is a sectional view taken along line 2—2 in FIGURE 1 at a reduced scale.

A typical die form or impressor is shown in FIGURES 1 and 2. The impressor is designated by the numeral 10 and consists of a generally rectangular block of steel or other suitable metallic material. The impressor 10 has two sets of longitudinal fingers cut along its opposite sides and designated by the numerals 13 and 14. It is to be noted that each finger has a sharply pointed tip while the lines or grooves between the fingers terminate in very small flat surfaces. The two pieces of lumber impaled upon the impressor 10 are designated by the numerals 11 and 12. As they are pressed endwise toward the impressor 10 the transverse end surfaces of the lumber pieces 11 and 12 impale themselves along the fingers 13 and 14 respectively. This produces a series of complementary fingers on the ends of the pieces 11 and 12. The fingers on the lumber pieces 11 and 12 will have flat tips corresponding to the grooves between the fingers 13 and 14 and will be sharply cut at their grooves between the lumber fingers. The object of this configuration is to eliminate any shattering of the wood fibers. The fibers are merely compressed laterally, rather than being severed or compressed longitudinally with respect to the boards 11 and 12. This result can best be seen by a study of the illustration of a typical photograph of the final joint.

Figure 4:
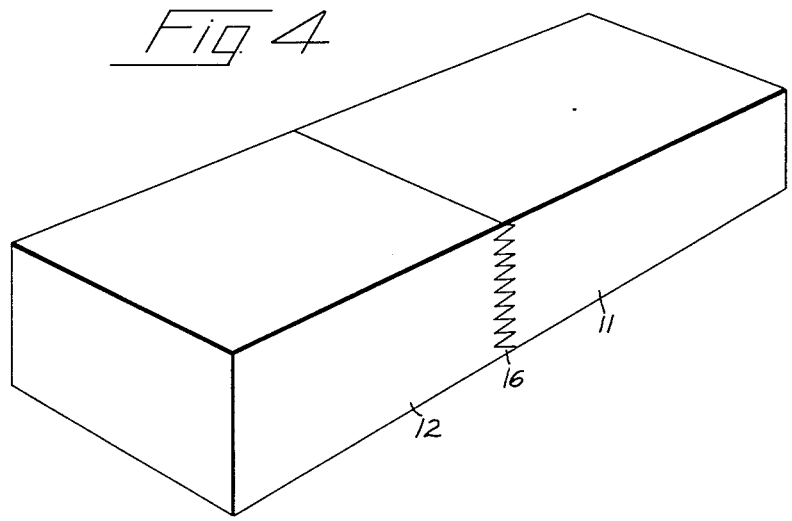
FIGURE 4 is a perspective view of a board end jointed according to the present invention.
Figure 5:
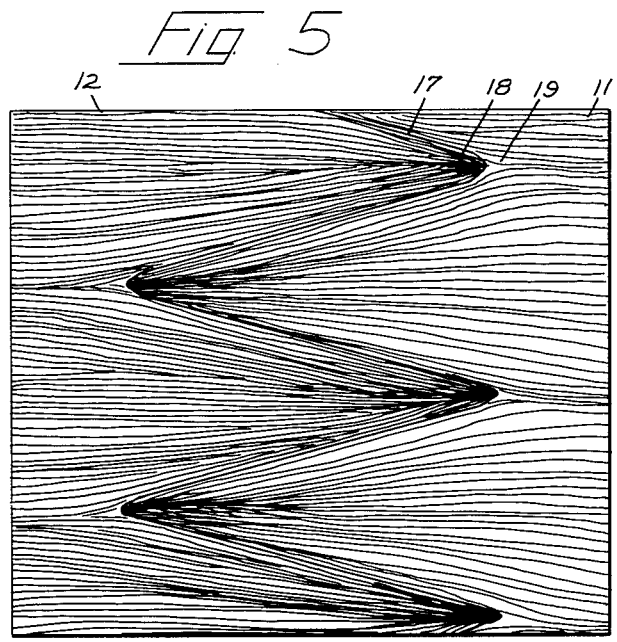
FIGURE 5 is an illustration of a photo-micrograph taken along a finger joint as prepared according to the present invention.

Such an illustration is shown in FIGURE 5. In this view the boards 11 and 12 are shown in their final joint positions as illustrated in FIGURE 4. The glue line 17 is quite dark but is very thin and properly defined between the boards 11 and 12. Due to the lateral compression of the wood fibers, and their essential side grain disposition the glue tends to remain as a well-defined glue line to accomplish an efficient bonding action. The tips of the lumber fingers are designated by the numeral 18. It is to be noted that the longitudinal wood fibers are quite solidly compressed at the areas of these tips. However, there is very little longitudinal compression of the fibers and they largely retain their normal longitudinal relationships. The second critical point in this joint is directly adjacent the grooves intermediate the fingers on the boards 11 and 12. This groove area is designated by the numeral 19 in FIGURE 5. It is to be noted that the cleavage of the wood 11 and 12 produces little or no longitudinal distortion of the wood at this area 19. Again the fibers of the wood are merely displaced laterally. The object of this arrangement is to provide a suitable bonding surface so that the glue line 17 will be disposed along parallel wood fibers so as to realize the maximum strength obtainable in typical parallel-grain bonding. The amount of compression obtainable at the finger tips 18 is limited by the maximum specific gravity of wood substance which is in the order of 1.5. The specific gravity of wood across a board varies considerably depending upon the type of grain encountered, that is, whether it is summer growth or spring growth. As a general rule, for example, in soft woods, a maximum level of compression is reached when the thickness is reduced to one third the normal thickness of the wood. Thus a compression ratio of one to three is the maximum amount of compression available in such woods.

The die 10 shown in FIGURE 1, is provided with four longitudinal apertures 15 which run throughout its length. The apertures 15 are designed to be connected to a suitable source of heat to raise the temperature of the impressor 10 to the proper level as disclosed later. This heat is utilized to set the fingers in the impaled boards 11 and 12. To measure and control the temperature of the impressor 10 a thermocouple (not shown) may be imbedded along the surface of the impressor 10.

A second typical form of an impressor such as would be utilized according to this invention is shown in FIGURES 6 and 7. This impressor 20 is designed for use in end joining relatively thin boards or veneer 21 and 22, such as may be utilized for plywood purposes. The impressor 20 is provided with a series of small fingers 23 and 24 along its opposite side surfaces. The fingers 23 and 24 are shown in a vertical position in FIGURE 6 so as to provide the necessary length to cover the ends of the veneers 21 and 22. The veneers 21 and 22 must be directed inwardly toward the impressor 20 by the usual pressure means. The fingers 23 and 24 have very small lands at both their finger tips and the ends of the grooves separating them. They form complementary fingers on the veneers 21 and 22 which can then be joined to produce the joint 26, shown in FIGURE 8. It is to be noted that joint 26 is extremely small even in comparison with joint 16, shown in FIGURE 4 between the two boards 11 and 12. The impressor 20 is also provided with four longitudinal apertures 25 through which heat is provided to the fingers 23 and 24.

The impressor utilized to deform the ends of the boards being joined must be provided with mating fingers machined into opposing faces which may be variously designed, depending primarily upon the wood species being joined. The impressor design may be changed to provide two separate impressors for the two boards, each impressor having a complementary finger surface. The impressors themselves may be directed by pressure toward the board in stationary aspect. In any event the main objective of the impressors is to impale the ends of the boards and thereby to form the necessary fingers for joining. The finger design can vary with respect to finger length, slope of the fingers, and thickness and shape of the finger tips and matching grooved bottoms.

In general, the maximum finger length is of the order of one-fourth (¼) to three-eighths (⅜) of an inch. The slope of the fingers varies within a practical range of 5 degrees to 30 degrees from the line of the grain of the wood to be impressed. The thickness of the finger tips and/or matching groove bottoms can vary from knife edge and sharp V respectively to a dimension of the order of 0.050 of an inch.

The design of the finger tips and corresponding groove bottoms is very important to the strength of the joint. The finger tips should be as thin as possible to keep the volume of wood compressed ahead of the tips to a minimum. On the other hand, the corresponding groove bottoms in the die need to be sufficiently wide so as to enable the grooves to be ground when forming the die.

The fingers of the impressor must be normal to the end grain surface of the wood, but the impressor may be rotated in this plane to any orientation.

Heating the impressor introduces two primary advantages, as follows:

(1) Heat tends to plasticize wood. Therefore, less pressure is required to impress finger joints into the wood. Also, this softening action permits the fibers to cleave with less damage.

(2) Heat tends to "set" the impressed fingers and thereby prevents the compressed wood in the fingers from springing back to its original shape.

The proper temperature for the effect is somewhere in the general range of 250 degrees F. to 400 degrees F. The actual maximum temperature is limited by that which will char or burn the wood.

To enhance the plasticizing effect of the heat, it is desirable to have moisture in the end grain of the wood prior to impression. This moisture may be applied either by direct wetting with water or by steaming.

Any pressure device (either air, hydraulic, or mechanical) may be used to impale the wooden members onto the impressor. However, two conditions must be met as follows:

(1) The end pressure delivered by the pressure system must be sufficient to attain complete impression.

(2) The thrust of the pressure device must be limited to the length of the impressed finger. Otherwise, compression failure may occur in the wooden member.

Once the wooden members are impaled on the impressor, contact with heated elements must be maintained for a sufficient length of time for the applied heat to "set" the fingers. The time limit is a function of wood species, the applied temperature, and the moisture content of the wood in the impressed area, and varies from 5 to 15 seconds.

Any type of glue or gluing technique may be used to bond the impressed fingers. This includes liquid or film glues, animal, vegetable, or synthetic base glues, or thermosetting or thermoplastic glues. The residual heat left in the wood from the impression process may be used to advantage to cure a thermosetting adhesive. However, the joint may also be bonded after allowing the impressed fingers to cool.

Since the maximum specific gravity of wood substance is approximately 1.50, this represents the upper limit of compaction obtainable by compression of wood. This factor is important in the design of the configuration of the impression joints since the lateral compression of the finger tips cannot exceed this value. Therefore if the compression ratio comparing the width between the die finger tips to the width of the groove bottom is three to one, complete impression cannot be achieved when the wood specific gravity exceeds 0.50 without telescoping the wood longitudinally, causing typical compression failures.

Figure 3:
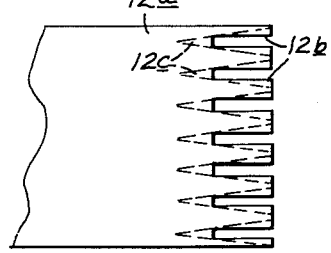
FIGURE 3 is an end view of another board which is pre-slotted preparatory to being impressed upon a die, the final fingers on the board being shown in dashed lines.

In order to reduce the distortion of wood grain when the average specific gravity of a wood specimen exceeds 0.50 while utilizing the impressors shown in FIGURES 1 and 6, it is advisable to pre-slot the ends of the boards being joined. These slotted ends are then better enabled to accommodate the tips of the die fingers. This procedure eliminates a partial amount of the wood cleavage by the die fingers but retains the lateral compression necessary to produce the desired glue surfaces. It also reduces the amount of pressure necessary for complete impression of the joint. A pre-slotted board is shown in FIGURE 3. The board 12a has a series of slots 12b cut across its end surface. The slots 12b have a rectangular configuration and are cut to approximately ⅔ of the die finger penetration depth. The final finger configuration of the board 12a shown in dashed lines and designated by the numeral 12c, extends beyond the slotted area and into the uncut fibers. This configuration will be obtained by subsequently impressing the board 12a upon a die such as the impressor 10, shown in FIGURES 1 and 2. As an alternative to the single slots shown in FIGURE 3, double slotting may be utilized wherein saws of progressive width are used to progressively form the depth of the grooves on the ends of the lumber being joined. This procedure will leave a pair of shoulders along each groove in contrast to the single shoulder left by the slots 12b, shown in FIGURE 3. However, such shoulders are subsequently smoothed during the impression upon the heated die. The slotting procedure utilized with respect to a particular species of wood depends upon its specific gravity and the amount of compaction which can be utilized during the impression forming of the fingers. In any case it is to be emphasized that the fingers themselves must be formed by pressure impression upon the die fingers; not by the pre-slotting technique. No severed fibers are to be left along the side of the lumber fingers before they are finally joined by the bonding process.

The slotting procedure just described has the advantage of maintaining parallel-to-grain gluing surfaces due to the impression, coupled with the advantage of reducing the required end pressure to levels that preclude compression failures in the members being impressed. This pre-slotting step is particularly advisable when utilizing the present method of end joining with respect to hard wood boards.

*Table 1.—Test of impressed joints*

| Included finger angle, degrees | Finger length, inches | Static bending | | | Tensile strength | | |
|---|---|---|---|---|---|---|---|
| | | Modulus of rupture | | Joint efficiency, percent | Tension, parallel to grain | | Joint efficiency, percent |
| | | Joint, p.s.i. | Control, p.s.i. | | Joint, p.s.i. | Control, p.s.i. | |
| 30 | 3/16 | 4,520 | 10,700 | 42 | ----- | ------ | -------- |
| 20 | 3/16 | 5,600 | 11,100 | 51 | ----- | ------ | -------- |
| 15 | 0.115 | 7,650 | 10,600 | 72 | 4,840 | 9,770 | 49 |
| 15 | ⅛ | 6,170 | 11,875 | 52 | 4,110 | 13,700 | 30 |
| 10 | 3/16 | 6,880 | 11,200 | 61 | 5,520 | 11,670 | 47 |
| 5 | ¼ | 6,840 | 11,200 | 61 | 5,530 | 11,380 | 48 |

*Table 2.—Test of pre-slotted impressed joints*

| Included finger angle, degrees | Finger length, inches | Static bending | | | Tensile strength | | |
| --- | --- | --- | --- | --- | --- | --- | --- |
| | | Modulus of rupture | | Joint efficiency, percent | Tension, parallel to grain | | Joint efficiency, percent |
| | | Joint, p.s.i. | Control, p.s.i. | | Joint, p.s.i. | Control, p.s.i. | |
| 20 | 3/16 | 7,190 | 10,630 | 67 | 5,010 | 11,520 | 43 |
| 15 | 1/8 | 7,690 | 12,100 | 63 | 5,110 | 11,260 | 45 |
| 10 | 3/16 | 9,290 | 12,240 | 76 | 6,420 | 11,160 | 58 |
| 5 | 1/4 | 7,835 | 12,855 | 61 | 5,950 | 11,760 | 51 |
| Combinations* | | 6,700 | 10,700 | 63 | 5,105 | 8,460 | 60 |

*Combination of 15 degrees, 1/8 inch and 10 degrees, 3/16 inch fingers in staggered arrangement.

In order to compare the instant joints with previous finger joints and scarf joints used in the industry to end join pieces of lumber, a series of tests have been conducted mainly using soft woods. Different impression dies have been designed and tested, using the die forms such as shown in FIGURES 1 and 6. The dies differ primarily in the length of the fingers and the included angle formed by the sides of the fingers.

The experimental procedure has been to saw two pieces to be impressed and joined from either end of a clear, straight grained ponderosa pine board. The center portion of the board was used as a clear wood control specimen. The ends of the two pieces to be impressed were dipped in water, the two pieces were placed in a jig on either side of a die preheated to 385 degrees F., and end pressure was applied to the assembly. As a result the two wood pieces were impressed simultaneously. End pressure was removed as soon as the impression was complete, but the wood members were left impaled on the die for five to ten seconds to allow the fingers to set.

The impressed wood pieces were allowed to cool, urea-melamine glue was spread on the fingers, the fingers were mated, end pressure was applied to the assembly, and finally radio frequency power was used to bond the impressed joints.

Both the jointed and the control specimens were conditioned for at least one week in an atmosphere of 70 degrees F. and 50% relative humidity. The specimens were tested in static bending with third-point loading and in tension parallel to the wood grain. Joint efficiency was determined and expressed as a percentage comparing joint strength to control strength.

The results obtained in these experiments are tabulated in Table 1 above. The best results obtained with joints impressed with the square cut end grain of ponderosa pine have been with a die of 15 degrees with the included angle between the finger, the fingers being 0.115 inch long. The average joint efficiencies with this die were 72% in static bending and 49% in tension parallel to the wood grain. This is comparable with the best published results for commercial finger joints of the presently used types. These results show an efficiency of 57% in static bending and 55% in tension parallel to the grain.

The test values required in Table 2 above were obtained by pre-slotting the fingers to two-thirds the full impressing depth. Such slots are shown in FIGURE 3. This pre-slotting procedure yielded higher strength values than full depth slotting. This is due to the fact that the original wood material is left in the bottom of the finger grooves and lends its full support to the joint strength.

Comparison of the finger joints with various scarf joints shows that only plain scarf joints of slopes of 1:6 or flatter exceed the tensile strength of the impressed finger joint. Most plain scarf joints used today by timber laminators have slopes of 1:8 to 1:12. Although such flat scarf joints do exceed the tensile strength of the impressed joints shown in FIGURES 1 through 8, such joints require a long board for efficient use. Cutting of the scarf wastes an appreciable amount of this board. Thus the figures given in Tables 1 and 2 serve to demonstrate the fact that the impressed finger joints manufactured according to the present invention exceed the strength properties of machine finger joints or plain scarf joints with slopes less than 1:6.

This invention also contemplates the use of a novel method of obtaining end joined lumber. FIGURE 9 illustrates schematically the typical process by which such lumber may be obtained. According to this process one must start with random lengths of lumber which are commonly termed "shorts." The initial pieces of lumber are designated by the numeral 28 and the initial supply stacks of the boards 28 are designated by the numeral 30. As seen in FIGURE 9, the short lengths of boards 28 move progressively upward along the left hand side of the figure. The boards 28 also move progressively upward along the right hand side of the figure but are interspersed with previously joined lumber below the desired lengths. These intermediate boards are designated by the numeral 29 while the finished standard length lumber is designated by the numeral 27 and is taken off the top of FIGURE 9. The boards 28 are initially trimmed by a pair of trim saws 32 which provide transverse plane surfaces at the ends to be joined. The boards 28 or 29 are then suitably wetted by use of a water spray apparatus designated by the numeral 33. This step may be eliminated if the boards 28 and 29 are sufficiently green. Next the boards 28 and 29 are pressed inwardly by suitable pressure rollers 35 to thereby impale the boards 28 and 29 on the fingers of an impressor 34 similar to that previously described. The impressor 34 is suitably heated by means of steam or hot water supplied through tubes 36. After the fingers are thoroughly set on the boards 28 and 29, they proceed to an apparatus for applying glue to the fingers formed on their opposing ends. The glue spray 37 may utilize any suitable glue or bonding material. The boards 28 and 29 are then joined together by means of pressure rolls 38. In this manner the glue joint between boards 28 and 29 is completed. If the finished board is then of the standard length desired, it will be trimmed by a cut off saw 39 and carried to the final loading destination. If the board is less than the desired length, then the board 29 proceeds through the process again until the desired length is obtained.

Various modifications may be made in the above described process. The trim saws 32 may trim the two boards separately or by a simultaneous cut across the joining boards. The pressure rolls 35 may be eliminated and suitable hydraulic rams substituted in their places. The same holds true for the pressure rolls 38. The means by which the glue is applied to the fingers may vary, depending upon the nature of the glue or the bonding agent. In any event the general arrangement shown in FIGURE 9 will be utilized in producing end joints according to the present invention.

The above joint produces many appreciable advantages compared to prior methods of jointing lumber. The end joints produced have fingers which are short, thereby eliminating much of the wasted wood produced by conventional machine finger jointing processes. No cutter heads are necessary to preform the joints. This eliminates a great deal of equipment cost and provides a process having low maintenance requirements. Where pre-slotting is necessary due to the nature of the wood, such pre-slotting can be obtained by the use of parallel saws, which are more easily maintained than are grooved cutting heads. The heating of the fingers produced in the boards lends this process particularly well to the preheat technique of bonding. The use of a thermo-setting glue applied to the hot wood to thereby utilize the inherent heat of the fingers to set the glue is particularly advantageous. The instant method eliminates the repetitious step of heating the fingers before applying the glue. Glue cost is reduced by the use of short fingers and by providing parallel grain gluing rather than end grain gluing. This advantage is particularly important and can't be overstressed. The disruption of the initial fiber relation in the wood is prevented as much as possible. The gluing between wood fibers occurs in a side by side relationship rather than an end to end configuration which occurs when the fibers are cut by machining. This eliminates the weak glue joint which occurs when wood fibers are glued between cut ends. The compaction of the fingers provides a dense glue surface which overcomes the tendency of the glue to run down the wood between fiber structures. This eliminates over-penetration of glue from the glue lines. In actual practice an extremely well defined glue line is obtained. The type of joint obtained by the present invention may be applied on lumber of any cross sectional size. The fact that the joints are manufactured by impression on a die produces fingers which can be held to very close tolerances by properly setting the fingers, using a combination of heat and moisture. Thus the quality of the finger joints is reproducible and can be held within desired limits, depending upon the quality of the boards being processed. Thus the strength of the wood joints can be quite accurately predicted.

Various modifications may be evident to one skilled in this field after a study of the above description. However, the basic concept of impressing finger joints using suitable dies, is subject to many alternative forms. Thus the invention described above is not to be limited by a precise illustration used. Only the claims which follow are intended to define and restrict the scope of the invention.

Having thus described my invention, I claim:

1. A joint formed between the ends of two aligned fibrous wooden boards of longitudinally grained lumber having longitudinal sides comprising:
    a plurality of laterally compressed fibrous fingers formed across opposing ends of the boards at complementary staggered positions, said fingers including sides oriented at acute angles relative to the longitudinal sides of the boards, said fingers having laterally compressed fibers disposed at an angle to the longitudinal sides of the boards and extending substantially parallel to the sides of the fingers, the fingers of the two boards being located in intermeshing side by side positions across the respective opposing ends thereof;
    and bonding means applied to the surfaces of said fingers adapted to permanently secure the adjacent fingers of the two boards in said intermeshing side by side positions.

2. A joint as defined in claim 1 wherein the surfaces of said fingers along said sides comprise uncut wood fibers.

3. A joint as defined in claim 1 wherein the angle subtended by the sides of the fingers relative to the wood grain is of the magnitude of 5 to 30 degrees.

4. A joint as defined in claim 1 wherein the longitudinal depth of the fingers is less than three-eighths of one inch.

5. A joint as defined in claim 1 wherein the lateral thickness of the outer tips of the fingers and the groove bottoms between fingers on the boards is respectively less than 0.050 inch.

6. A process of end joining a pair of fibrous wooden boards having longitudinal sides and ends substantially perpendicular to the longitudinal grain configurations thereof, comprising the following steps:
    impaling the ends of the boards on a die surface comprising a plurality of parallel tapered fingers adapted to cleave the board ends along parallel lines and to laterally compress the fibrous wood substance between adjacent die fingers with the laterally compressed fibers thereof disposed at an angle to the longitudinal sides of the boards and extending substantially parallel to the sides of the fingers formed across the impaled ends of the boards;
    applying a bonding agent to the impaled ends of the boards after removal from the die surface;
    and forcing the impaled ends of the two boards toward one another in opposed directions in intermeshing positions prior to the setting of the bonding agent.

7. The process defined in claim 6 further comprising the following step before impaling the boards on the die surface:
    cutting a plurality of parallel slots across the ends of the boards, the slots being less wide than the impaled thickness of the die fingers and being less deep than the impaled depth of the die fingers, the center to center distance between adjacent slots being equal to the center to center distance between adjacent die fingers.

8. The process as defined in claim 6 wherein the die surface is heated to a temperature less than the charring temperature of the boards and wherein the boards are maintained in contact with the die surface after being impaled thereon for a duration of time sufficient to permanently deform the fibrous wood substance adjacent the die surface.

9. The process as defined in claim 7 wherein the die surface is heated to a temperature less than the charring temperature of the boards and wherein the boards are maintained in contact with the die surface after being impaled thereon for a duration of time sufficient to permanently deform the fibrous wood substance adjacent the die surface.

10. A process of end joining a pair of fibrous wooden boards having longitudinal sides and ends substantially perpendicular to the longitudinal grain configurations thereof, comprising the following steps:
    moistening the ends of the boards to be joined;
    impaling the moistened ends on a heated die surface while subjecting the boards to end pressure perpendicular to the die surface, said die surface having formed thereon a plurality of parallel pointed fingers having plane sloped sides adapted to cleave the board ends along parallel lines and to compact the fibrous wood substance located between adjacent die fingers;
    maintaining the boards in impaled contact with the die surface for a time duration sufficient to permanently deform the fibrous wood substance adjacent the die surface with the laterally compressed fibers thereof disposed at an angle to the longitudinal sides of the boards and extending parallel to the sides of the fingers formed across the impaled ends of the boards;
    removing the boards from contact with the die surface;
    applying a bonding agent to the impaled ends of the boards;
    aligning the opposed ends in intermeshing positions;
    and applying opposed end pressure to the boards in the direction of the joint during the setting of the bonding agent.

11. The process defined in claim 10 further comprising the following step before moistening the ends of the board:

cutting a plurality of parallel slots across the ends of the boards, the slots being less wide than the impaled thickness of the die fingers and being less deep than the impaled depth of the die fingers, the center to center distance between adjacent slots being equal to the center to center distance between adjacent die fingers.

12. The process defined in claim 10 wherein:

the end pressure under which the ends of the boards are impaled is sufficient to attain impression of the die fingers to the desired depth;

and the endwise motion of the board relative to the die surface after contact is limited to the depth of the die fingers.

13. A joint formed between two aligned fibrous wooden boards of longitudinally grained lumber having longitudinal sides, comprising:

a plurality of laterally compressed fibrous fingers formed across opposing ends of the boards at complementary staggered positions, said fingers including sides oriented at acute angles relative to the longitudinal sides of the boards, said fingers having laterally compressed fibers disposed at an angle to the longitudinal sides of the boards and extending substantially parallel to the sides of the fingers, the wood fibers in said fingers being compressed to a greater degree at the outer ends thereof than at the inner ends of the fingers, the fingers of the two boards being located in intermeshing side by side positions across the respective opposing ends thereof;

and bonding means applied to the surfaces of said fingers adapted to permanently secure the adjacent fingers of the two boards in said intermeshing side by side positions.

14. A joint formed between two aligned fibrous wooden boards of longitudinally grained lumber having longitudinal sides, comprising:

a plurality of laterally compressed fibrous fingers formed across opposing ends of the boards at complementary staggered positions, said fingers including sides oriented at acute angles relative to the longitudinal sides of the boards, said fingers having laterally compressed fibers disposed at an angle to the longitudinal sides of the boards and extending substantially parallel to the sides of the fingers, the wood fibers at the outer tips of the fingers being compressed laterally to thereby increase the specific gravity of the tips to a value less than the maximum specific gravity of wood substance, the fingers of the two boards being located in intermeshing side by side positions across the respective opposing ends thereof;

and bonding means applied to the surfaces of said fingers adapted to permanently secure the adjacent fingers of the two boards in said intermeshing side by side positions.

References Cited by the Examiner

UNITED STATES PATENTS

| 206,534 | 7/1878 | Brock | 144—309.6 X |
| 2,564,055 | 8/1951 | Elmendorf | 144—309.6 X |

FOREIGN PATENTS 843,330  3/1939  France.

FRANK L. ABBOTT, *Primary Examiner.*

JACOB L. NACKENOFF, BENJAMIN BENDETT,
*Examiners.*

D. H. SWITZER, J. E. MURTAGH,
*Assistant Examiners.*